United States Patent [19]

Coleman et al.

[11] Patent Number: 5,251,874
[45] Date of Patent: Oct. 12, 1993

[54] VALVE SHAFT SEAL

[75] Inventors: Steven W. Coleman, Lakewood; Rory Murphy, Long Beach; Angus R. Lemon, Anaheim, all of Calif.

[73] Assignee: Allied-Signal Inc., Morristown, N.J.

[21] Appl. No.: 673,625

[22] Filed: Mar. 22, 1991

[51] Int. Cl.⁵ ............................................. F16K 41/00
[52] U.S. Cl. ..................................... 251/214; 251/305; 277/27; 277/174
[58] Field of Search ........................ 251/214, 305, 308; 277/15, 27, 236, 174; 137/312

[56] References Cited

U.S. PATENT DOCUMENTS

| | | | |
|---|---|---|---|
| 3,001,385 | 9/1961 | Allen | 277/174 UX |
| 3,088,706 | 5/1963 | Hill | 251/214 |
| 3,746,301 | 7/1973 | Budzich et al. | 251/214 |
| 3,988,000 | 10/1976 | Reese | 251/305 |
| 4,022,424 | 5/1977 | Davis et al. | 251/214 |
| 4,231,341 | 11/1980 | Kuramoto et al. | 251/214 |
| 4,408,766 | 10/1983 | Paech | 277/27 |
| 4,451,048 | 5/1984 | Pick | 277/27 |
| 4,541,612 | 9/1985 | Yohner | 251/214 |
| 4,640,305 | 2/1987 | Johnson | 251/214 |
| 4,659,064 | 4/1987 | Scobie et al. | 251/214 |
| 4,682,758 | 7/1987 | Scobie et al. | 251/308 |
| 4,773,440 | 9/1988 | Yanagawa | 251/214 |
| 4,924,840 | 5/1990 | Wade | 123/568 |

FOREIGN PATENT DOCUMENTS 1284862 12/1966 France.
2325867 4/1977 France.
2203821 10/1988 United Kingdom.

OTHER PUBLICATIONS

Patent Abstracts of Japan Dec. 23, 1988 & JP, A, 63 212 728 (Yamaha Motor Co. Ltd.) Sep. 5, 1988.

Primary Examiner—George L. Walton
Attorney, Agent, or Firm—Ken C. Decker; William N. Antonis

[57] ABSTRACT

An engine exhaust gas system includes a conduit for transferring exhaust gas, and a butterfly valve within the conduit for controlling communication of exhaust gas through the conduit. The butterfly valve is mounted on a shaft for pivoting relative to the conduit. The shaft is supported on a bushing in a transverse bore. Leakage through the clearance between the bushing and the shaft acts upon the transverse face of a washer which is freely slidable on the shaft, urging the latter into engagement with a retaining ring carried on the housing to effect sealing of the clearance. As the pressure of exhaust gases increases, the washer is urged more forcefully against the retaining ring, thereby improving the effectiveness of the seal.

10 Claims, 1 Drawing Sheet

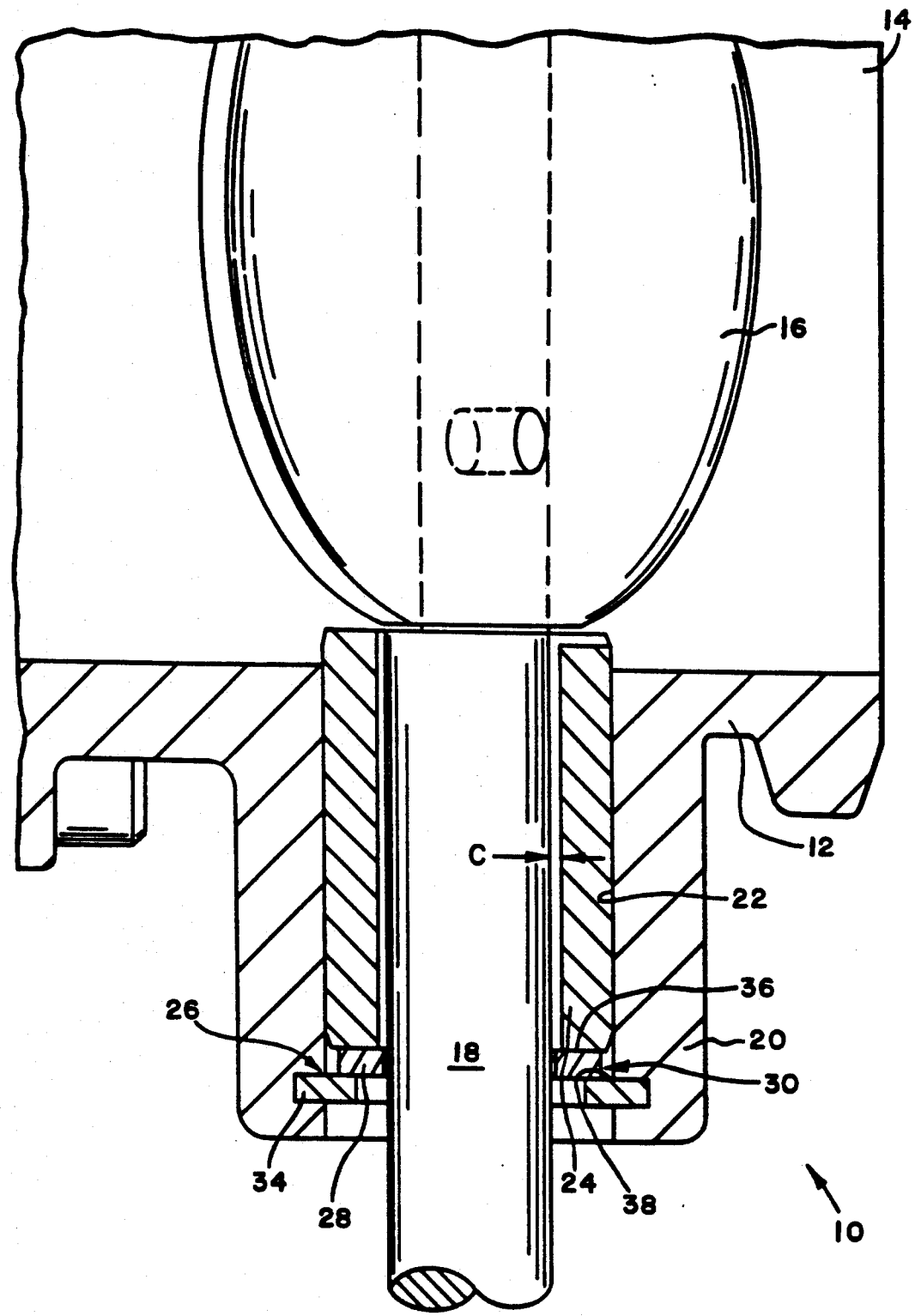

VALVE SHAFT SEAL

This invention relates to a control shaft and high temperature seal used to operate a butterfly valve controlling transfer of exhaust gas in an exhaust gas system.

Exhaust gas systems are commonly provided with flow control valves to control the flow of exhaust gas within the system. For example, it is often necessary to close off the exhaust gas in a compression ignition engine for particulate control or for allowing or aiding the engine to warm-up quickly. Such control valves are normally mounted on a control shaft which is pivotally mounted in a shaft housing which extends transversely relative to the exhaust gas conduit. However, when the valve is used to close off the system to backpressure the engine, the high pressure level is achieved upstream of the valve. Since some finite clearance is required between the control shaft and its supporting structure to allow smooth operation of the valve, exhaust gas leaks through this clearance causing noise, depositing exhaust gas products and soot on adjacent parts, and creates a hazardous accumulation of poisonous exhaust gas products. Normal sealing materials cannot be used in the high temperature environment of engine exhaust systems.

The present invention provides a pressure seal which is actuated in response to exhaust gas leakage around the valve supporting shaft so that the exhaust gas does not leak from the exhaust system. According to the invention, a floating washer seal, which may be made out of temperature resistant metal or another temperature resistant material, floats on the valve shaft and is urged into engagement with an retaining ring which is carried on the shaft housing. Accordingly, exhaust gas products leaking through the clearance between the shaft and the supporting structure force the washer against the retaining ring with a force which increases as the exhaust gas pressure increases, so that exhaust gas leakage past the washer is minimized.

These and other advantages of the present invention will become apparent from the following description, with reference to the accompanying drawings, the sole FIGURE of which is a vertical cross-section of a portion of an exhaust gas housing incorporating the present invention.

Referring now to the drawing, an exhaust gas system generally indicated by the numeral 10 includes a conduit 12 defining an exhaust gas passage 14. The conduit 12 communicates exhaust from, for example, an internal combustion engine. A butterfly valve 16 is mounted on a shaft 18 which pivots with respect to the conduit 12. Accordingly, by rotation of the shaft 18, the butterfly valve 16 can be moved from the position shown in the drawing, in which substantially unimpeded flow of exhaust gases is permitted through the exhaust gas passage 14, to a position rotated substantially 70° from the position illustrated in the drawing, in which flow of exhaust gases through the passage 14 is substantially blocked, thereby backpressuring the engine for reasons as discussed above. Clearly, of course, the butterfly valve can be positioned in positions intermediate from the fully opened and fully closed position.

The shaft 18 is supported in a shaft housing 20 which extends transversely with respect to the conduit 12. Housing 20 defines bore 22 therewithin which receives a bushing 24 for rotatably supporting the shaft 18. The clearance c between the shaft and the bushing must be large enough to permit smooth operation of the shaft 18 without binding over a substantial temperature range. Since the exhaust gas communicated through the passage 14 can reach very high temperatures, the clearance c must accommodate relative expansion between the various components. However, the clearance c also provides a leakage path for the exhaust gases from the passage 14 to the exterior of the housing.

As discussed hereinabove, leakage of exhaust gases around the shaft 18 has undesirable consequences. Accordingly, a pressure seal generally indicated by the numeral 26 has been provided to impede leakage of exhaust gases from the passage 14. The seal 26 includes a washer 28 which is freely slidable on the shaft 18 and is received within the gap 30 defined between end face 36 of the bushing 24 and a retaining ring 34 which is carried on the wall of the bore 22 and projects transversely toward the shaft 18. The retaining ring 34 extends completely around the shaft 18. The pressure of exhaust gases leaking through the clearance c react upon the transverse face 36 of the washer 28, urging the latter into engagement with the transverse face 38 of the retaining ring 34. As the pressure of the exhaust gases increases, the washer is urged even more tightly against the retaining ring 34, thereby increasing the effectiveness of the seal, to substantially reduce leakage of the exhaust gases from the housing, although some leakage is possible. The temperatures involved require that the various components, such as the washer 28, retaining ring 34 and bushing 24, be made of temperature resistant materials, such as high temperature metals. Since resilient materials, such as rubber, cannot be used, the effectiveness of the seal depends on the metal-to-metal contact between the washer 28 and the retaining ring 34.

Although the invention has been described in relationship to an exhaust gas system for an internal combustion engine, such as one that might be used to power a motor vehicle, the invention is applicable whenever control of flow of high pressure, high temperature gasses through a conduit system occurs, such as flue stacks, stationary internal combustion engines, etc.

We claim:

1. Exhaust gas system comprising a conduit for transferring exhaust gas, valve means within said conduit for controlling communication of exhaust gas through said conduit, and control means for controlling said valve means, said control means including a shaft extending from said valve means, a shaft housing extending transversely from said conduit means and defining a bore therewithin receiving said shaft, a bushing in said bore rotatably supporting said shaft, projecting means projecting from said housing into said bore, said shaft extending through said projecting means, and a washer surrounding said shaft and freely slidable on said shaft, said washer being freely slidable in an axial direction toward and away from said projecting means and said bushing, said bushing being mounted in and supported by said bore, said bushing rotatably supporting said shaft with clearance sufficient to permit smooth rotation of said shaft with respect to said bushing, said clearance defining a leakage path from said conduit into said housing for said leaking exhaust gasses, said washer being responsive to the pressure of exhaust gasses leaking into said housing from said conduit around said shaft through said clearance to slide along said shaft and engage said projecting means to thereby inhibit escape of said leaked exhaust gasses from said housing.

2. Exhaust gas system as claimed in claim 1, wherein said projecting means extends transversely relative to said bore, said washer having a transverse surface extending transversely with respect to said bore against which the pressure of said leaked exhaust gasses act to drive said washer against the projecting means.

3. Exhaust gas system as claimed in claim 1, wherein said bushing has an end cooperating with said projecting means to define a gap therebetween, said shaft extending through said gap, said washer being carried by the portion of the shaft extending through said gap and being slidable on the shaft between the end of the bushing and the projecting means.

4. Exhaust gas system as claimed in claim 3, wherein said projecting means is a retaining ring carried by said housing and projecting into said bore.

5. Exhaust gas system as claimed in claim 1, wherein said bushing, said projecting means, and said washer are made from a temperature resistant material sufficient to withstand temperatures attained by the exhaust gasses of an internal combustion engine without substantial degradation.

6. Control shaft and high temperature seal for inhibiting leakage of high temperature fluids leaking around said shaft comprising a shaft housing defining a bore therewithin receiving said shaft, a bushing in said bore rotatably supporting said shaft, projecting means projecting from said housing into said bore, said shaft extending through said projecting means, and a washer surrounding said shaft and freely slidable in an axial direction thereon, said washer being freely slidable toward and away from said projecting means and said bushing, said bushing being mounted in and supported by said bore, said bushing rotatably supporting said shaft with clearance sufficient to permit smooth rotation of said shaft with respect to said bushing, said clearance defining a leakage path from said conduit into said housing for said leaking exhaust gasses, said washer being responsive to the pressure of fluids leaking around said shaft through said clearance into said housing to slide along said shaft and engage said projecting means to thereby inhibit escape of said leaked fluids from said housing.

7. Control shaft and high temperature seal as claimed in claim 6, wherein said projecting means extends transversely relative to said bore, said washer having a transverse surface extending transversely with respect to said bore against which the pressure of said leaked fluids act to drive said washer against the projecting means.

8. Control shaft and high temperature seal as claimed in claim 6, wherein said bushing has an end cooperating with said projecting means to define a gap therebetween, said shaft extending through said gap, said washer being carried by the portion of the shaft extending through said gap and being slidable on the shaft between the end, of the bushing and the projecting means.

9. Control shaft and high temperature seal as claimed in claim 8, wherein said projecting means is a retaining ring carried by said housing and projecting into said bore.

10. Control shaft and high temperature seal as claimed in claim 6, wherein said bushing, said projecting means, and said washer are made from a temperature resistant material sufficient to withstand temperatures attained by the exhaust gasses of an internal combustion engine without substantial degradation.

* * * * *